April 13, 1954  E. H. BORN  2,674,853
MOTION IMPARTING HYDRAULIC APPARATUS
Filed May 2, 1952  4 Sheets-Sheet 3

INVENTOR.
ELLIS H. BORN
BY
Herschel C. Omohundro
attorney

April 13, 1954   E. H. BORN   2,674,853
MOTION IMPARTING HYDRAULIC APPARATUS
Filed May 2, 1952   4 Sheets-Sheet 4
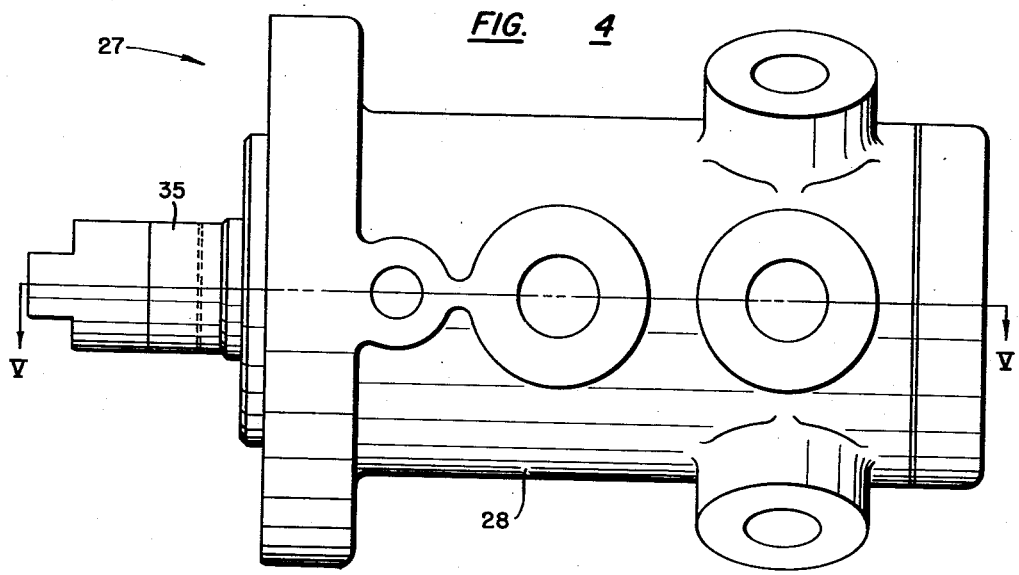
FIG. 4
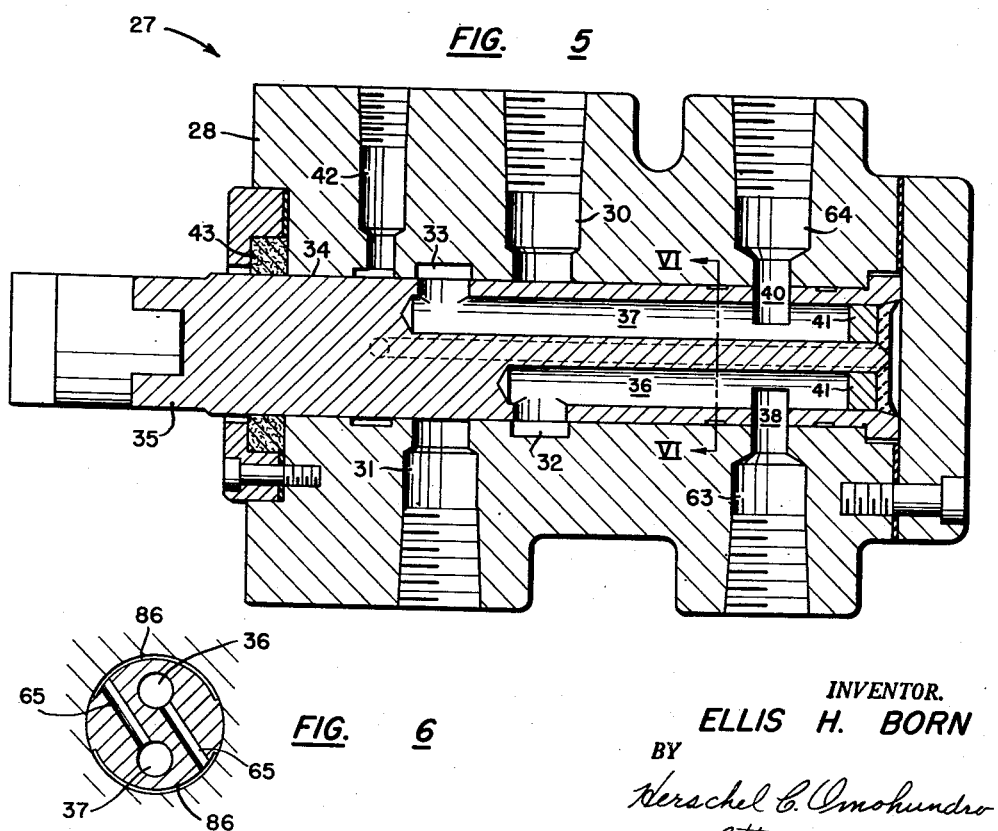
FIG. 5
FIG. 6
INVENTOR.
ELLIS H. BORN
BY
Herschel C. Omohundro
Attorney Patented Apr. 13, 1954

2,674,853

UNITED STATES PATENT OFFICE 2,674,853

MOTION IMPARTING HYDRAULIC APPARATUS

Ellis H. Born, Columbus, Ohio, assignor to The Denison Engineering Company, Columbus, Ohio, a corporation of Ohio Application May 2, 1952, Serial No. 285,815

2 Claims. (Cl. 60—97)

1

This invention relates generally to hydraulics and is particularly directed to hydraulic apparatus for imparting motion to machine parts such as chain mechanisms of conveyors, feed wheels for bin discharging mechanism and other devices which are designed to operate under heavy load and at relatively slow speeds.

An object of the invention is to provide an automatic hydraulic system and hydraulically operated means for motivating apparatus of the type mentioned in the preceding paragraph.

An object of this invention also is to provide a plurality of fluid pressure energy translating devices of equal speed and torque characteristics having a common source of fluid pressure and being connected by a motion transmitting connection whereby a transfer mechanism, such as a conveyor, may be driven at a plurality of points in absolute synchronism.

Another object of the invention is to provide hydraulically operated motion transmitting mechanism in the form of a plurality of separate power cylinders which cooperate to drive a shaft, the latter in turn operating a valve mechanism for controlling the flow of fluid to the power cylinders.

A further object of the invention is to provide a plurality of motion transmitting devices of the type mentioned in the preceding paragraph and to connect these devices so that they will operate in unison or proper sequence to effect the desired motion of the device driven thereby.

Another object of the invention is to provide a novel rotary control valve mechanism which is provided with a stationary casing and a rotatable valve stem which cooperates with a plurality of circumferentially spaced ports to direct fluid from a source of pressure to the power cylinders of the motion transmitting mechanism and the return of exhaust fluid from the power cylinders to a reservoir forming a part of the fluid pressure source.

Further objects and advantages of the present invention will be apparent from the following description, reference being had to the accompanying drawings wherein a preferred form of embodiment of the invention is clearly shown.

In the drawings:

Fig. 4 is a plan view of a distributing valve formed in accordance with the invention and utilized with the driving mechanism shown in Fig. 2.

Fig. 5 is a longitudinal sectional view taken through the valve shown in Fig. 4 on the plane indicated by the line V—V of that figure.

Fig. 6 is a transverse sectional view taken through the valve on the plane indicated by the line VI—VI of Fig. 5.

Fig. 7 is a detail longitudinal sectional view taken through one of the power cylinders shown in Fig. 2 on the plane indicated by line VII—VII of that figure.

Figure 1:
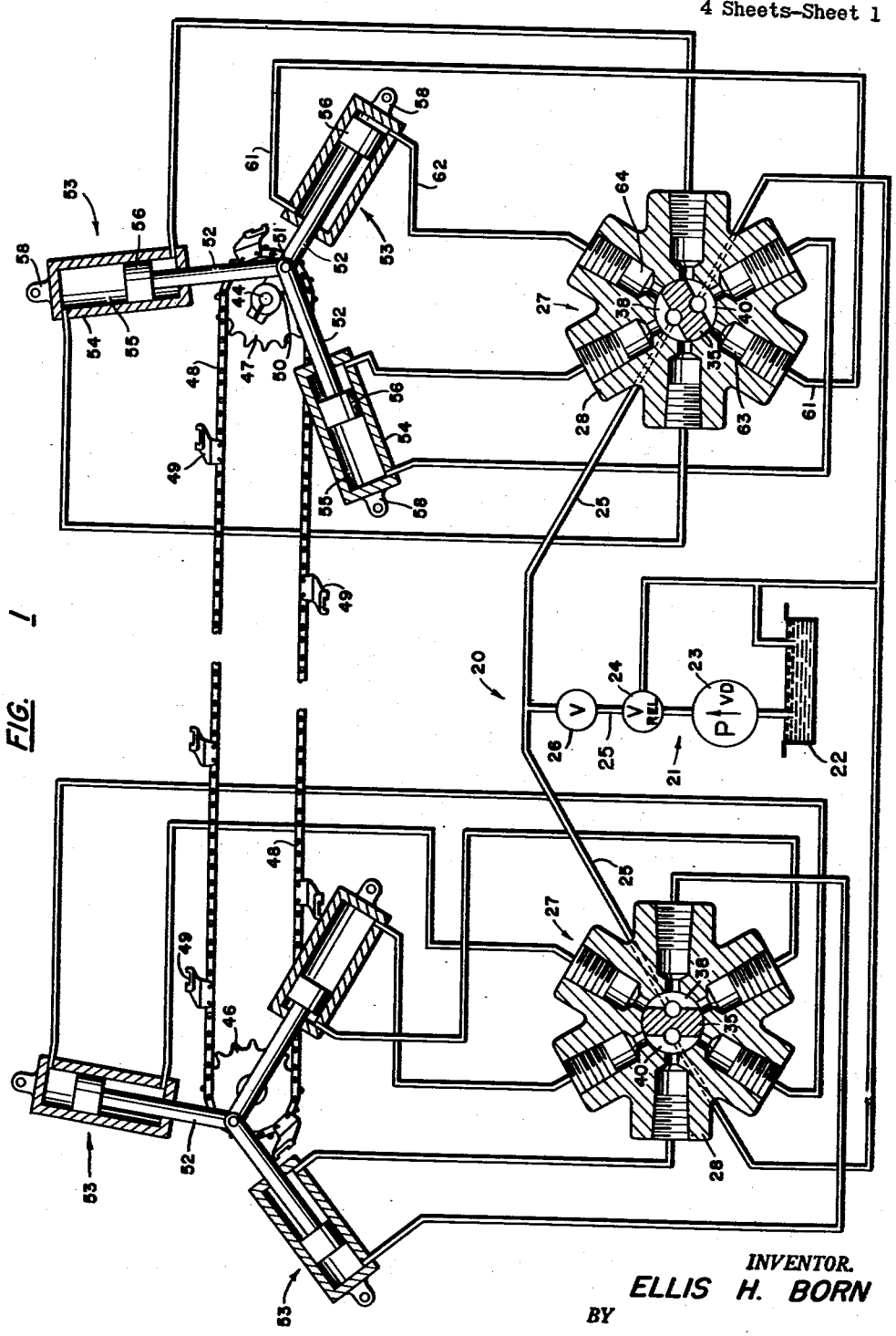
Fig. 1 is a diagrammatic view of a hydraulic system formed in accordance with the present invention, parts of the apparatus used in the system being shown in section.

Referring more particularly to the drawings, the numeral 20 indicates the hydraulic system in its entirety. This system includes a source of fluid pressure 21 having a reservoir 22, a motor driven pump 23 and a relief valve 24, this valve being provided as usual to maintain pressure in the hydraulic system and to return excess fluid delivered by the pump 23 back to the reservoir 22. A fluid line 25 extends from the relief valve 24 to conduct fluid to the system 20. Line 25 contains a control valve 26 which may be of any suitable type to regulate the volume of fluid flowing from the source of pressure to the system and consequently the rate of operation of the apparatus in such system. Line 25 extends to a plurality of, in this instance two, distributing valves 27, these valves being of the type shown in detail in Figs. 4 to 6, inclusive.

Each valve 27 includes a stationary casing 28 having longitudinaly spaced inlet and outlet ports 30 and 31. Port 30 of each valve casing is connected with the line 25 which extends from the source of fluid pressure 21. As shown in Fig. 5, ports 30 and 31 communicate with grooves 32 and 33 which are spaced longitudinally of the body 28 and extend annularly around a bore 34 formed in the body 28. This bore 34 is formed for the reception of a pintle valve 35 which is provided with longitudinally extending passages 36 and 37. These passages are connected, as shown in Figs. 1 and 5 with slots 38 and 40 extending transversely across the pintle 35. The passages 36 and 37 extend into the member 35 from one end and are plugged as at 41 to prevent fluid flowing from the passages into the bore 34 at this point. A suitable drain 42 is provided between the groove 33 and the end of the casing to conduct fluid seeping from this groove along the member 35, to exhaust. Packing 43 is also provided around the member 35 to further prevent the escape of fluid around the pintle.

Member 35 is connected, in any suitable manner, to a shaft 44 which is journaled for rotation in bearings 45 provided in connection with a supporting framework 46. This shaft may be employed to drive any desired mechanism, the present illustration showing the shaft 44 provided with a sprocket wheel 47, this sprocket wheel having a chain 48 trained around it, the chain being provided with hooks 49 or other equivalent devices to transmit motion to cars or any other work carrying members. The shaft 44 is also provided with a crank 50 to which is pivotally secured, as at 51, the outer ends of a plurality of piston rods 52. These piston rods extend from an equivalent number of power cylinders designated generally by the numeral 53.

Figure 2:
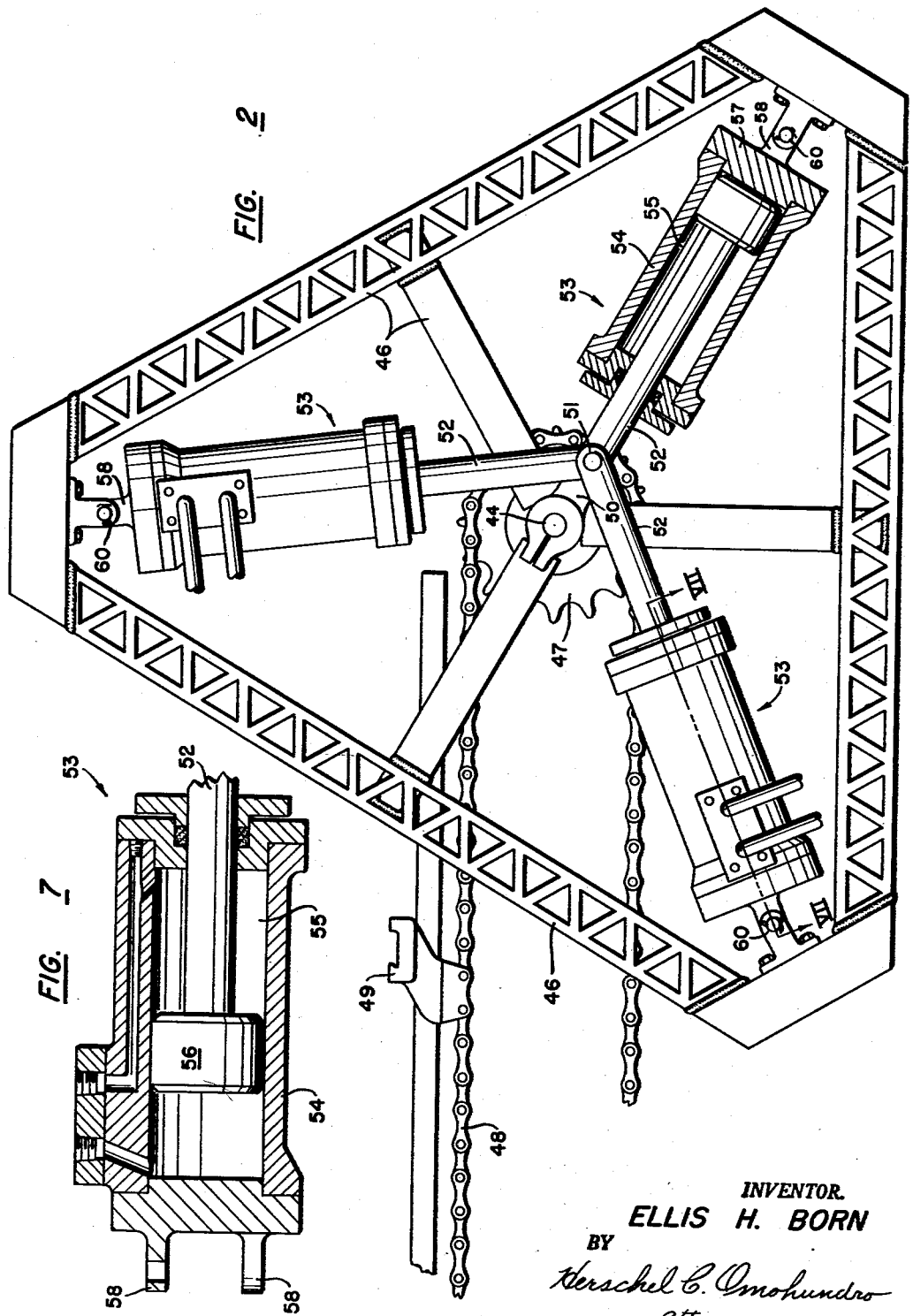
Fig. 2 is a side elevational view of a driving mechanism for a conveyor, such driving mechanism being formed in accordance with the present invention and including apparatus shown in Fig. 1.
Figure 3:
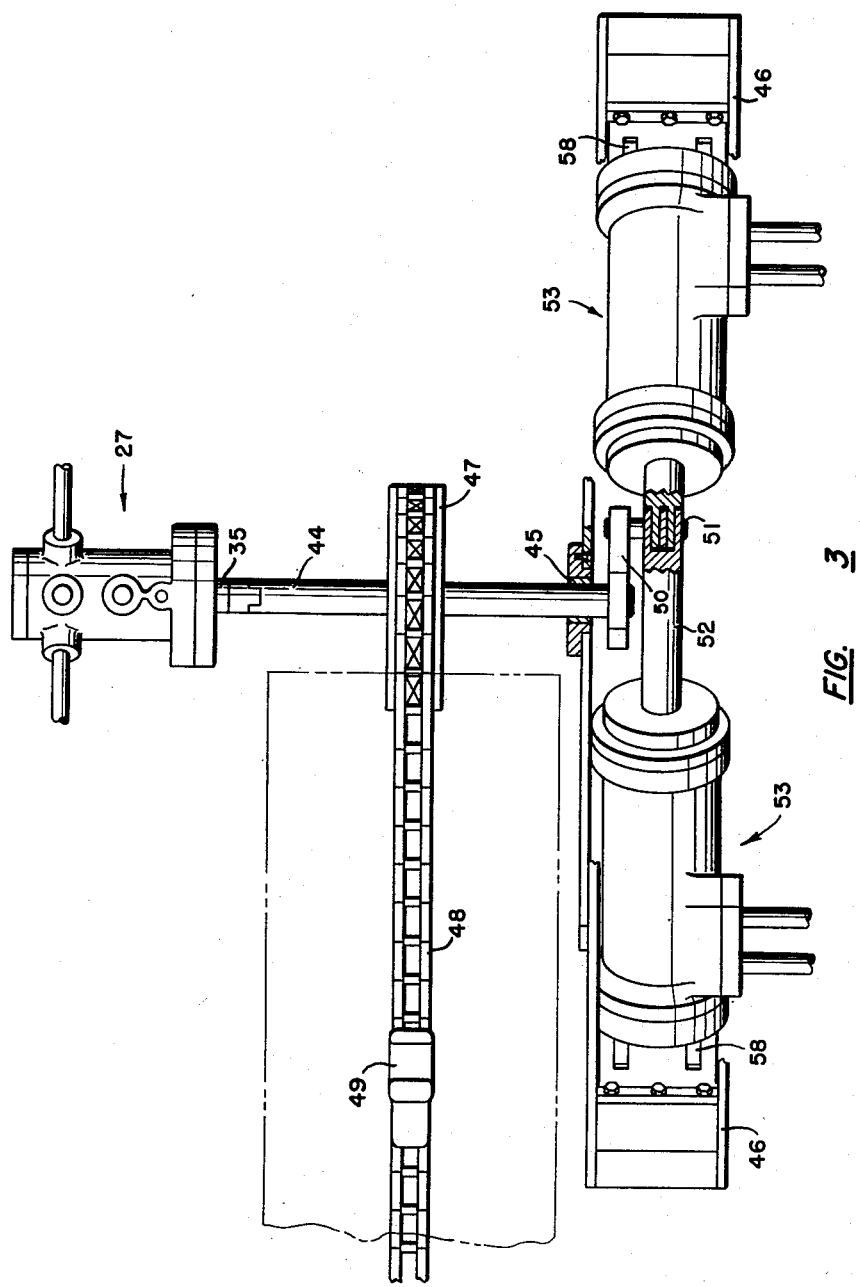
Fig. 3 is a plan view, partly in section, showing the mechanism disclosed in Fig. 2.

Power cylinders 53 are substantially duplicates and a description of one will suffice for all. Each includes a cylindrical body 54 having a piston chamber 55 for the reception of a piston 56. Each cylinder is provided with a head 57 at one end, which head is equipped with spaced ears 58, by which the cylinder is connected with the supporting frame mechanism 46, the ears forming an articulated joint as at 60 to permit the cylinders to rock relative to the support 46. It will be obvious, from Fig. 2, that as the shaft 44 revolves the crank 50 will do likewise causing the pivot 51 to rotate about the axis of the shaft 44. This movement will cause the power cylinders to rock about the pivots 60.

To effect the movement of the shaft 44, fluid under pressure is supplied to the power cylinders through a plurality of conductors 61 and 62, these conductors extending to the opposite ends of the power cylinders from diametrically opposed cylinder ports 63 and 64 in the valve casing 28. The ports 63 and 64 alternately serve as inlet and outlet ports for the power cylinders depending upon the position of the pintle 35 in the casing. As this pintle revolves, the pressure source is alternately connected with the opposite ends of each power cylinder while the other end of such cylinder is connected with exhaust. When one end of a power cylinder is connected with the pressure source, fluid under pressure will be admitted to this end and will cause the piston 56 to be forced toward the opposite end. This motion will be imparted by the piston rod to the crank 50 which will, in turn, cause the shaft 44 to revolve. Since this shaft is connected with the pintle 35, the latter will revolve causing the pressure and exhaust connections to the power cylinder to be reversed. A plurality of cylinders are employed to prevent the shaft from being disposed in a dead center position, to provide smoother operation and also to furnish sufficient power to cause the operation of the mechanism provided in connection with the shaft 44.

The operation of the mechanism is believed to be obvious from an inspection of the drawings and the description thus far. It will be summarized here, however, and is as follows:

The fluid from the pressure source is introduced to the distributor valves 27 through line 25. This fluid flows into the valve casing 28 through port 30 and is admitted to passage 36 in the pintle 35. It flows from the passage 36 into the transverse slot 38 and from this slot into the ports 63 or 64 communicating therewith at the particular time. This fluid will flow through lines 61 or 62 leading from the respective ports to the ends of the power cylinders to cause the pistons therein to reciprocate and impart movement through piston rods to the shaft 44. As this shaft revolves, rotary motion will be imparted to the sprocket wheel, carried by the shaft, and by the sprocket wheel to the chain 48 and lugs 49 carried thereby. The chain 48 is trained around another sprocket wheel 46 carried by a second shaft 44, the chain serving to coordinate the motion of the sprockets and the shafts. Since the distributing valves are driven by or in unison with the shafts, the motors formed by the power cylinders, shafts and valves will operate in proper sequence. It will be obvious that, while only two driving units have been illustrated, as many as are necessary for a specific operation may be provided and connected with one another so that their operations will be properly coordinated.

The pintle is substantially balanced in the casing 28 by providing the pintle with grooves 65 which extend partially around the pintle and connecting these grooves with the port or passage 36 or 37 on the opposite side of the axis of the pintle. In this manner, fluid pressure, which tends to seep from the transverse slot 38 between the pintle and casing and would ordinarily tend to force the pintle into engagement with one side of the bore, will be balanced and the pintle thus centered. The grooves 86 are duplicated on opposite sides of the inlet and outlet ports to more effectively balance the pintle.

While the form of embodiment of the present invention as herein disclosed constitutes a preferred form, it is to be understood that other forms might be adopted, all coming within the scope of the claims which follow.

I claim:

1. Hydraulic apparatus comprising a source of fluid pressure; a plurality of rotatable shafts; a group of power cylinders disposed in circumferentially spaced radial relation to each shaft, each power cylinder having a piston and a piston rod; crank means on each shaft in registration with the respective group of cylinders, the rods of such cylinders being connected with said crank means; a distributing valve for each group of power cylinders, each valve having an element communicating with said pressure source and exhaust and with the ends of said power cylinders; a second element connected with one of the shafts and operated thereby to alternately connect the ends of the power cylinders with the pressure source and exhaust; and a motion transmitting means connecting said shafts to cause substantially simultaneous rotation thereof.

2. Hydraulic apparatus comprising a source of fluid pressure; a plurality of rotatable shafts; a group of power cylinders disposed in circumferentially spaced radial relation to each shaft, each power cylinder having a piston and a piston rod; crank means on each shaft in registration with the respective group of cylinders, the rods of such cylinders being connected with said crank means; a distributing valve for each group of power cylinders, each valve having an element communicating with said pressure source and exhaust and with the ends of said power cylinders; a second element connected with one of the shafts and operated thereby to alternately connect the ends of the power cylinders with the pressure source and exhaust; a sprocket means provided on said shafts; and an endless chain trained around said sprocket means, said chain serving to synchronize the rotation of said shafts and the operations of said power cylinders.

References Cited in the file of this patent

UNITED STATES PATENTS

| Number | Name | Date |
|---|---|---|
| 757,970 | Sears | Apr. 19, 1904 |
| 1,530,881 | Burks | Mar. 24, 1925 |
| 1,921,380 | Barker, Jr. | Aug. 8, 1933 |
| 1,989,212 | Pascolini | Jan. 29, 1935 |
| 2,350,066 | Parker | May 30, 1944 |
| 2,505,951 | Feaster | May 2, 1950 |

FOREIGN PATENTS

| Number | Country | Date |
|---|---|---|
| 561,784 | France | Aug. 17, 1923 |
| 114,525 | Sweden | July 17, 1945 |